US012412902B2

(12) United States Patent
Hasegawa et al.

(10) Patent No.: US 12,412,902 B2
(45) Date of Patent: Sep. 9, 2025

(54) LITHIUM IRON COMPLEX OXIDE, CATHODE MATERIAL, CATHODE, AND LITHIUM-ION SECONDARY BATTERY

(71) Applicant: TDK CORPORATION, Tokyo (JP)

(72) Inventors: Tomohiko Hasegawa, Tokyo (JP); Kosuke Sato, Tokyo (JP); Hiroki Karisyuku, Tokyo (JP); Takashi Mori, Tokyo (JP)

(73) Assignee: TDK CORPORATION, Tokyo (JP)

( * ) Notice: Subject to any disclaimer, the term of this patent is extended or adjusted under 35 U.S.C. 154(b) by 573 days.

(21) Appl. No.: 17/913,739

(22) PCT Filed: Jan. 7, 2022

(86) PCT No.: PCT/JP2022/000359
§ 371 (c)(1),
(2) Date: Sep. 22, 2022

(87) PCT Pub. No.: WO2022/149611
PCT Pub. Date: Jul. 14, 2022

(65) Prior Publication Data
US 2023/0112744 A1   Apr. 13, 2023

(30) Foreign Application Priority Data

Jan. 8, 2021 (JP) ................. 2021-002344
Jan. 8, 2021 (JP) ................. 2021-002345
Jan. 8, 2021 (JP) ................. 2021-002346

(51) Int. Cl.
*H01M 4/62* (2006.01)
*C01G 49/00* (2006.01)
(Continued)

(52) U.S. Cl.
CPC ........ *H01M 4/628* (2013.01); *C01G 49/0027* (2013.01); *H01M 4/525* (2013.01);
(Continued)

(58) Field of Classification Search
CPC .. H01M 4/628; H01M 4/525; H01M 10/0525; H01M 2004/028; H01M 4/131;
(Continued)

(56) References Cited

U.S. PATENT DOCUMENTS

2006/0257737 A1  11/2006  Goh et al.
2008/0070122 A1  3/2008  Park et al.
(Continued)

FOREIGN PATENT DOCUMENTS

CN    103247797 A    8/2013
CN    107437610 A    12/2017
(Continued)

OTHER PUBLICATIONS

Hirano et al. "Electrochemical properties and Mossbauer effect of anti-fluorite type compound Li5FeO4" Solid State Ionics vol. 176, Issues 37-38, Nov. 2005, pp. 2777-2782 (Year: 2005).*
(Continued)

*Primary Examiner* — Andrew J. Oyer
(74) *Attorney, Agent, or Firm* — Oliff PLC

(57) ABSTRACT

A lithium iron complex oxide is represented by $Li_5FeO_4$, two peaks with different quadrupole splitting values (QS) analyzed using $^{57}Fe$ Mössbauer spectroscopy are shown, one of the two peaks, a peak A, satisfies QS>0, and the other one of the two peaks, a peak B, satisfies QS=0.

10 Claims, 2 Drawing Sheets

(51) Int. Cl.
*H01M 4/02* (2006.01)
*H01M 4/525* (2010.01)
*H01M 10/0525* (2010.01)

(52) U.S. Cl.
CPC ..... *H01M 10/0525* (2013.01); *C01P 2002/82* (2013.01); *C01P 2002/89* (2013.01); *C01P 2004/84* (2013.01); *C01P 2006/40* (2013.01); *H01M 2004/028* (2013.01)

(58) Field of Classification Search
CPC .... H01M 4/136; H01M 4/366; H01M 4/5825; H01M 4/625; H01M 4/13; H01M 4/36; H01M 4/485; H01M 4/505; H01M 4/62; H01M 10/052; C01G 49/0027; C01P 2002/82; C01P 2002/89; C01P 2004/84; C01P 2006/40; Y02E 60/10
See application file for complete search history.

(56) References Cited

U.S. PATENT DOCUMENTS

| | | | |
|---|---|---|---|
| 2010/0227220 | A1 | 9/2010 | Thackeray et al. |
| 2013/0188294 | A1 | 7/2013 | Kim et al. |
| 2015/0372304 | A1 | 12/2015 | Hasegawa et al. |
| 2016/0156021 | A1 | 6/2016 | Aihara et al. |
| 2017/0084920 | A1 | 3/2017 | Sawai et al. |
| 2017/0346070 | A1 | 11/2017 | Kim et al. |
| 2021/0194042 | A1* | 6/2021 | Wolverton ............ H01M 4/525 |
| 2022/0006069 | A1 | 1/2022 | Harada |
| 2022/0190379 | A1 | 6/2022 | Okazaki et al. |

FOREIGN PATENT DOCUMENTS

| | | |
|---|---|---|
| CN | 107492636 A | 12/2017 |
| JP | H06-342673 A | 12/1994 |
| JP | 2004-207055 A | 7/2004 |
| JP | 2014-067629 A | 4/2014 |
| JP | 2015-088268 A | 5/2015 |
| JP | 2016-012620 A | 1/2016 |
| JP | 2016-103411 A | 6/2016 |
| JP | 2017-130359 A | 7/2017 |
| JP | 2017-130557 A | 7/2017 |
| JP | 2018-185906 A | 11/2018 |
| JP | 2020-050554 A | 4/2020 |
| JP | 2020-053314 A | 4/2020 |
| WO | 2012/165212 A1 | 12/2012 |
| WO | 2015/011883 A1 | 1/2015 |

OTHER PUBLICATIONS

Mar. 15, 2022 Search Report issued in International Patent Application No. PCT/JP2022/000359.

Hirano et al., "Electrochemical properties and Mossbauer effect of anti-fluorite type compound, Li5FeO4," Solid State Ionics, 2005, p. 2777-2782.

* cited by examiner

LITHIUM IRON COMPLEX OXIDE, CATHODE MATERIAL, CATHODE, AND LITHIUM-ION SECONDARY BATTERY

TECHNICAL FIELD

The present invention relates to a lithium iron complex oxide, a cathode material, a cathode, and a lithium-ion secondary battery. Priority is claimed on Japanese Patent Application No. 2021-002344, Japanese Patent Application No. 2021-002345, and Japanese Patent Application No. 2021-002346 filed Jan. 8, 2021, the content of which is incorporated herein by reference.

BACKGROUND ART

Lithium-ion secondary batteries are characterized by the small size and large capacity thereof. Lithium-ion secondary batteries have come to be installed not only in electronic equipment such as mobile phones and notebook computers, but also in moving bodies such as automobiles and drones in recent years. Lithium-ion secondary batteries are expanding in applications thereof more and more.

As the performance of applications increases, lithium-ion secondary batteries are also required to have further improved characteristics. In particular, there is a great demand for improving energy density. In order to increase the energy density, it is necessary to increase the capacity of each of the cathode active material and the anode active material. Graphite is a typical material as an anode active material. Graphite has excellent life and output characteristics, is inexpensive, and has been widely used as an anode active material. On the other hand, the capacity of graphite has already been used up to the theoretical value, and conversion from graphite to another material is being considered in order to increase the capacity of the anode.

As an alternative anode to graphite, alloy-based anode active materials represented by silicon or silicon oxide are being studied. These anode active materials can occlude lithium several to ten times as much as graphite, and have a much larger capacity than graphite. On the other hand, these anode active materials cause irreversible structural changes at the time of initial charging, and trap lithium ions in the structure. The trapped lithium ions cannot contribute to the subsequent charging/discharging reaction, and thus a sufficient cell capacity cannot be achieved.

In order to prevent the lithium ions from being trapped in the anode active material, a technique called lithium pre-doping, in which lithium is occluded in the anode in advance, has been proposed. By performing lithium pre-doping, it is possible to prevent the lithium released from the cathode from being consumed and to increase the capacity of the alloy-based anode active material. Lithium pre-doping can be performed on either the cathode or the anode. For example, Patent Document 1 reports an example in which a lithium iron complex oxide having an anti-fluorite crystal structure having a large irreversible capacity at the time of initial charging/discharging is used for the cathode. For example, Patent Document 2 reports that, in order to improve the high resistance of the lithium iron complex oxide, carbon coating by chemical vapor deposition is performed to improve the characteristics.

CITATION LIST

Patent Literature

[Patent Document 1]
Japanese Unexamined Patent Application Publication No. 2004-207055
[Patent Document 2]
Japanese Unexamined Patent Application Publication No. 2017-130359

SUMMARY OF INVENTION

Technical Problem

As one of the lithium iron complex oxides, there is a lithium iron complex oxide. The lithium iron complex oxide has a problem that the resistance thereof is high and the irreversible capacity thereof is not sufficiently expressed. In other words, the lithium iron complex oxide may not be sufficiently effective as a lithium pre-doped material.

The present disclosure has been made in view of the above problems, and an object thereof is to increase the irreversible capacity of the lithium iron complex oxide.

Solution to Problem (1) A lithium iron complex oxide according to a first aspect is represented by $Li_5FeO_4$, two peaks with different quadrupole splitting values (QS) analyzed using $^{57}Fe$ Mössbauer spectroscopy are shown, one of the two peaks, a peak A, satisfies QS>0, and the other one of the two peaks, a peak B, satisfies QS=0.

(2) In the lithium iron complex oxide according to the aspect, the peak A and the peak B may have an isomer shift value (IS) of 0.05 or more and 0.25 or less, respectively.

(3) In the lithium iron complex oxide according to the aspect, when an area value of the peak A is $S_A$ and an area value of the peak B is $S_B$, $0.01 \leq S_B/(S_A+S_B) \leq 0.50$ may be satisfied.

(4) A cathode material according to a second aspect contains the lithium iron complex oxide according to the above aspect.

(5) A cathode material according to a third aspect contains the lithium iron complex oxide according to the above aspect, and a coating layer which coats a surface of the lithium iron complex oxide, and the coating layer contains lithium silicate.

(6) In the cathode material according to the above aspect, a mass ratio of the coating layer may be 0.1% by mass or more and 3.0% by mass or less with respect to the entire cathode material.

(7) A cathode material according to a fourth aspect contains the lithium iron complex oxide according to the above aspect, and a coating layer which coats a surface of the lithium iron complex oxide, and the coating layer contains diamond-like carbon.

(8) In the cathode material according to the above aspect, in Raman spectrum analysis of the coating layer, a spectrum of a G band of 1580 $cm^{-1}$ and a spectrum of a D band of 1350 $cm^{-1}$ may partially overlap each other, and a G/D ratio, which is a ratio of peak intensities of the G band to the D band, may be 1.5 or less.

(9) A cathode according to a fifth aspect contains the cathode material according to the above aspect.

(10) A lithium-ion secondary battery according to a sixth aspect includes the cathode according to the above aspect.

Advantageous Effects of Invention

The lithium iron complex oxide according to the above aspect can increase the irreversible capacity.

DESCRIPTION OF EMBODIMENTS

Figure 1:
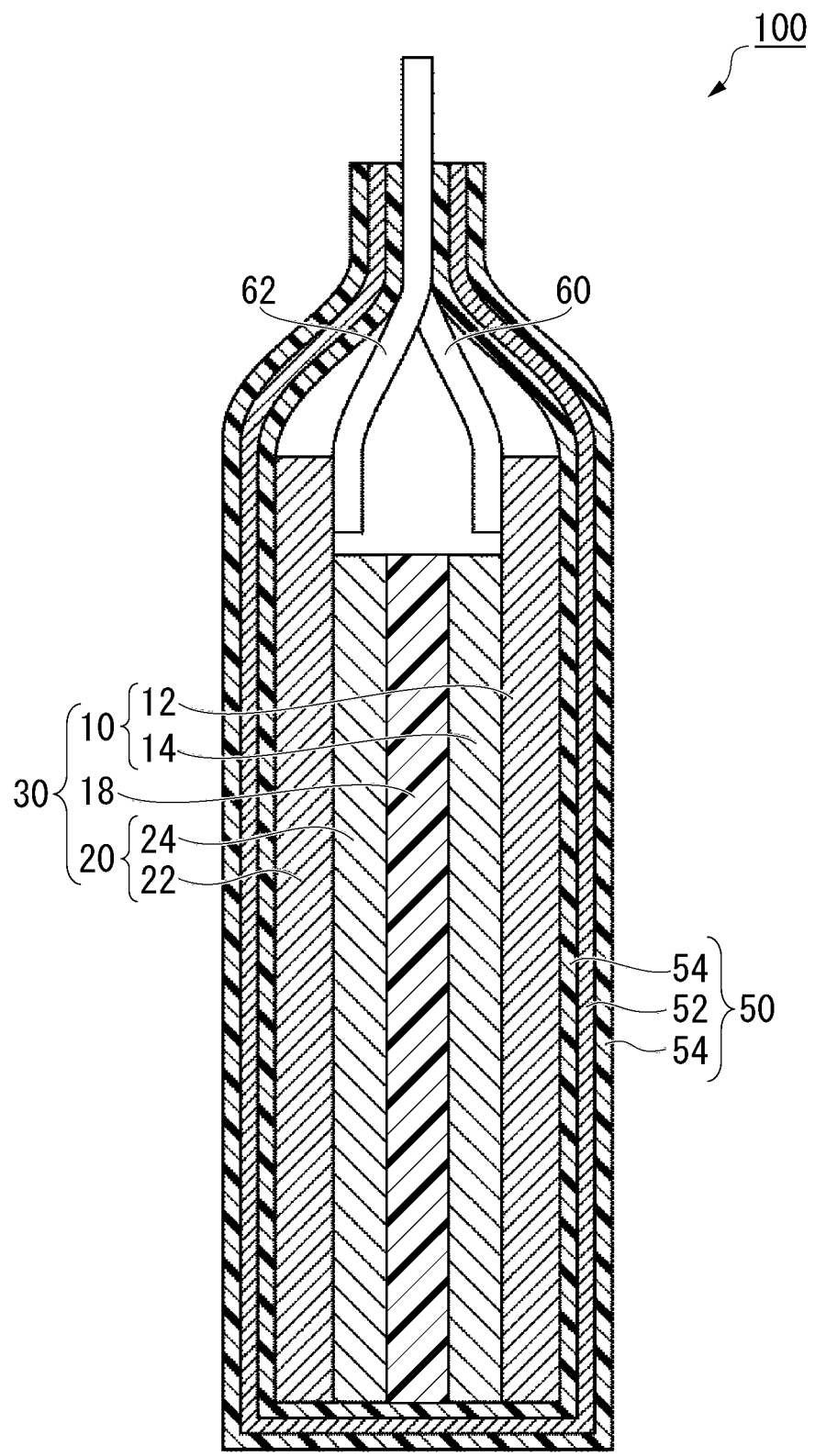
FIG. 1 is a schematic view of a lithium-ion secondary battery according to a first embodiment.

Hereinafter, an embodiment will be described in detail with reference to the drawings as appropriate. In the drawings used in the following description, characteristic parts are enlarged and illustrated for convenience in order to make it easy to understand the features, and the dimensional ratios of each configuration element may differ from the actual ones. In addition, the materials and dimensions in the following description are exemplary examples, the present invention is not necessarily limited thereto, and the present disclosure can be appropriately changed without changing the gist thereof. Further, the configuration elements described below can be combined as appropriate.

[Lithium-Ion Secondary Battery]

FIG. 1 is a schematic view of a lithium-ion secondary battery according to a first embodiment. A lithium-ion secondary battery 100 shown in FIG. 1 includes a laminated body 30, an electrolyte solution containing lithium ions, a case 50, a lead 60, and a lead 62. The case 50 accommodates the laminated body 30 and the electrolyte solution in a sealed state. One end of the lead 60 is electrically connected to a cathode 10, and the other end projects to the outside of the case 50. One end of the lead 62 is electrically connected to an anode 20, and the other end projects to the outside of the case.

The laminated body 30 includes the cathode 10, the anode 20, and a separator 18. Each of the cathode 10, the anode 20, and the separator 18 is, for example, a plate-shaped member. The separator 18 is located between the cathode 10 and the anode 20. The laminated body 30 may be replaced with a wound body in which a structure having the cathode 10, the separator 18, and the anode 20 laminated in this order is wound. The cathode 10 has, for example, a cathode current collector 12 and a cathode active material layer 14. The cathode active material layer 14 is in contact with at least one surface of the cathode current collector 12. The anode 20 has, for example, an anode current collector 22 and an anode active material layer 24. The anode active material layer 24 is in contact with at least one surface of the anode current collector 22. The separator 18 is positioned between the cathode active material layer 14 and the anode active material layer 24.

<Cathode>

The cathode 10 includes the cathode current collector 12 and the cathode active material layer 14.

[Cathode Current Collector]

The cathode current collector 12 is, for example, a conductive plate material.

The cathode current collector 12 is, for example, a thin plate of a metal such as aluminum, copper, nickel, titanium, or stainless steel, or an alloy thereof. The cathode current collector 12 is, for example, a metal foil.

[Cathode Active Material Layer]

The cathode active material layer 14 contains, for example, a cathode active material, a cathode binder, a conductive auxiliary agent, and an additive. The additive is an example of a cathode material. The additive functions, for example, as a pre-doped material.

(Additive)

The additive contains a lithium iron complex oxide represented by $Li_5FeO_4$. $Li_5FeO_4$ is a notation for a stoichiometric composition, and the lithium iron complex oxide may have element deficiencies or the like.

Figure 2:
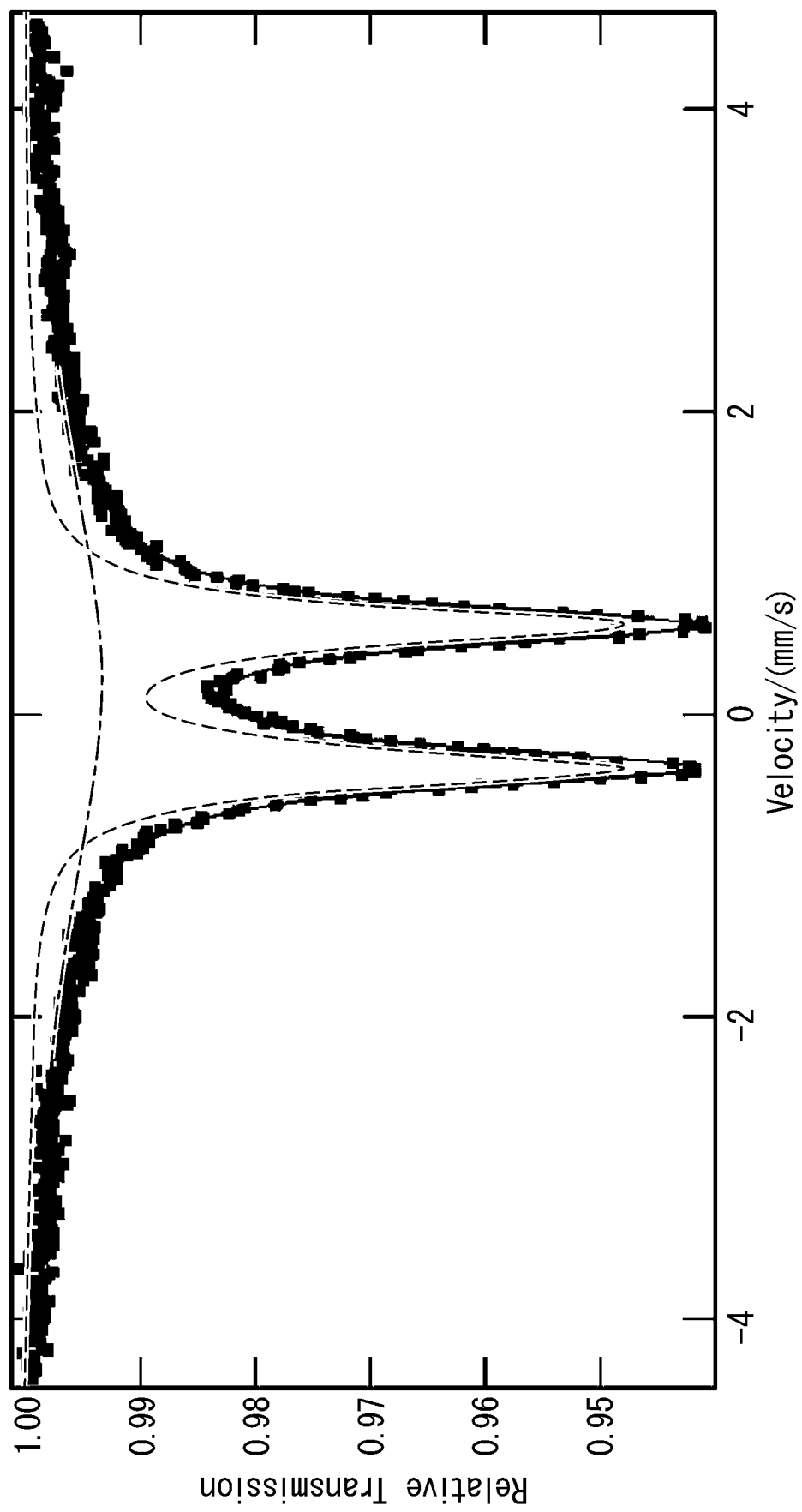
FIG. 2 is a Mössbauer spectroscopic analysis result of an example of a cathode material of the lithium-ion secondary battery according to the first embodiment.

The lithium iron complex oxide shows two peaks with different quadrupole splitting values (QS) analyzed using $^{57}Fe$ Mössbauer spectroscopy. FIG. 2 is a Mössbauer spectroscopic analysis result of an example of the additive of the lithium-ion secondary battery according to the first embodiment. The solid line in FIG. 2 is a measured value, the dotted line is one peak obtained by analyzing the measured value and separating the value into peaks (hereinafter referred to as peak A), and the alternating long and short dashed line is one peak obtained by analyzing the measured value and separating the value into peaks (hereinafter referred to as peak B).

The peak A is a peak caused by the crystalline component of the lithium iron complex oxide. The quadrupole splitting value (QS) of the peak A is the interval between the two minimum values (the interval between level splits), and satisfies QS>0.

The peak B is a peak caused by the amorphous component of the lithium iron complex oxide. The peak B has one minimum value, and the quadrupole splitting value (QS) satisfies QS=0. In other words, the fact that the peak B is confirmed indicates that the lithium iron complex oxide contains an X-ray amorphous substance.

The lithium iron complex oxide is presumed to be microcrystalline because the quadrupole splitting value (QS) analyzed using $^{57}Fe$ Mössbauer spectroscopy shows the peak A and the peak B. The lithium iron complex oxide according to the present embodiment easily releases lithium ions. The lithium iron complex oxide having low crystallinity tends to release lithium ions more easily than the lithium iron complex oxide having high crystallinity, and the resistance tends to decrease. As a result, the lithium-ion secondary battery containing the substance has a sufficiently large irreversible capacity at the time of initial charging.

The pre-doped material preferably has a large irreversible capacity. This is because the pre-doped material releases Li only at the time of initial charging, contributes to the reaction, and does not assume a reversible reaction. Therefore, the lithium iron complex oxide according to the present embodiment functions suitably as a pre-doped material.

The lithium iron complex oxide according to the present embodiment preferably has an isomer shift value (IS) of each of the peak A and the peak B of 0.05 or more and 0.25 or less. The isomer shift value (IS) is one of the measurement parameters of $^{57}Fe$ Mössbauer spectroscopy, and is a numerical value of the deviation from the central relative velocity output from the measuring instrument performing $^{57}Fe$ Mössbauer spectroscopy.

In the lithium iron complex oxide according to the present embodiment, in the $^{57}Fe$ Mössbauer spectroscopy, the IS of each of the peak A and the peak B is preferably 0.05 or more and 0.25 or less, and more preferably 0.11 or more and 0.22 or less. When this value is within the range, it can be considered that there is no change in the valence of Fe due to microcrystallization, and an increase in grain-boundary resistance can be suppressed.

In the lithium iron complex oxide according to the present embodiment, when the area value of the peak A is $S_A$ and the area value of the peak B is $S_B$, preferably, $0.01 \leq S_B/(S_A+S_B) \leq 0.50$ is satisfied, and more preferably, $0.01 \leq S_B/(S_A+S_B) \leq 0.20$ is satisfied. The microcrystalline lithium iron complex oxide which is satisfied this range are less susceptible to structural deterioration. The area values of the peak A and the peak B can be obtained by the half width method after expressing each observation data by two Lorentzian functions and extracting the hyperfine parameters by the least squares method.

The lithium iron complex oxide according to the present embodiment can be produced by a synthesis process and a microcrystallization process.

The synthesis process can be carried out by a known method and is not particularly limited. For example, an iron source and a lithium source are combined by a mechanical milling treatment such as with a ball mill, and then fired. The iron source is, for example, $Fe_2O_3$, $Fe_3O_4$, or the like. The lithium source is, for example, a lithium, $Li_2O$, $Li_2CO_3$, LiOH or the like.

In the microcrystallization process, the material synthesized in the synthesis process is mechanically milled. The mechanical milling treatment can be performed by, for example, a ball mill or the like. When the mechanical milling treatment is performed, the materials collide with each other, the powder propagates and is crushed repeatedly, and a lamellar structure is formed. As the treatment time increases, the layer spacing of the lamellar structure gradually narrows and becomes random, resulting in a microcrystalline structure.

Analysis of the lithium iron complex oxide by $^{57}Fe$ Mössbauer spectroscopy can be performed even when the state is not a powder state. For example, when the cathode does not contain other iron compounds, the analysis can be performed even in the state of the cathode. First, the cathode active material layer and the cathode current collector are separated by a spatula or the like, and the obtained cathode active material layer is analyzed.

Up to this point, an example in which the lithium iron complex oxide is applied as a simple substance has been shown, but a coating layer may be formed on the surface of the lithium iron complex oxide. In other words, the additive may include a lithium iron complex oxide and a coating layer which coats the surface of the lithium iron complex oxide.

The coating layer may contain, for example, lithium silicate. Lithium silicate protects the surface of the lithium iron complex oxide and further enhances the irreversible capacity of the additive. The reason for this is not clear, but it is considered that silicide is formed between the lithium silicate and the lithium iron complex oxide to improve the adhesion of the coating layer.

Lithium silicate prevents the lithium iron complex oxide from reacting with $H_2O$ and $CO_2$ in the atmosphere. When the lithium iron complex oxide reacts with a gas in the atmosphere, a highly alkaline compound such as LiOH or $Li_2CO_3$ is generated on the surface of the particles. The highly alkaline compound reacts with the electrolytic solution during charging to form a high resistance film, and inhibits the charging reaction of the lithium iron complex oxide.

The mass ratio of the coating layer containing lithium silicate is preferably 0.1% by mass or more and 3.0% by mass or less with respect to the total mass of the additive. The total mass of the additive is, for example, the total mass of the lithium iron complex oxide and the coating layer. When the ratio of the coating layer is in this range, excessive silicate is not formed and the adverse effect on the battery characteristics is small. The mass ratio of the coating layer can be determined by optical emission spectroscopic analysis (ICP).

The coating layer containing lithium silicate can be produced by several methods. For example, by mechanically milling a lithium iron complex oxide and a silicate material with a ball mill or the like, a coating layer containing lithium silicate can be formed on the surface of the lithium iron complex oxide. Further, for example, a coating layer containing lithium silicate can be formed by forming a silicon oxide film such as $SiO_2$ on the surface of the lithium iron complex oxide by a sol-gel method or the like and then firing the film. The coating layer can be analyzed by, for example, X-ray diffraction (XRD), X-ray photoelectron spectroscopy (XPS), transmission electron microscope (TEM) observation, inductively coupled plasma (ICP) emission spectrometry, and the like.

The coating layer may contain, for example, diamond-like carbon (DLC). In DLC, the carbon in the film predominates in the $sp^3$ structure, and the DLC has a structure close to amorphous. The coating layer containing DLC prevents the lithium iron complex oxide from reacting with $H_2O$ and $CO_2$ in the atmosphere. When the lithium iron complex oxide reacts with a gas in the atmosphere, a highly alkaline compound such as LiOH or $Li_2CO_3$ is generated on the surface of the particles. The highly alkaline compound reacts with the electrolytic solution during charging to form a high resistance film, and inhibits the charging reaction of the lithium iron complex oxide.

The DLC can be formed, for example, at a low temperature of 500° C. or lower. For example, when a carbon film is formed at a high temperature exceeding 600° C., a part of the transition metal of the lithium iron complex oxide is reduced, which may adversely affect the battery characteristics. With DLC, a carbon coating can be formed without reducing the lithium iron complex oxide. The use of a coating material containing DLC improves the cycle characteristics of the lithium-ion secondary battery.

In the coating layer containing DLC, in Raman spectrum analysis of the coating layer, the spectrum of the G band of 1580 $cm^{-1}$ and the spectrum of the D band of 1350 $cm^{-1}$ preferably partially overlap each other, and the G/D ratio, which is a ratio of peak intensities of the G band to the D band, is preferably 1.5 or less.

The carbon coating formed at a high temperature tends to grow a graphite structure and has a high G/D ratio. A case where the G/D ratio is 1.5 or less indicates that the film is formed at a low temperature. In other words, having a coating layer satisfying the above conditions suppresses the reduction of the lithium iron complex oxide, and further improves the cycle characteristics of the lithium-ion secondary battery.

The film thickness of the coating layer containing DLC is, for example, 1 nm or more and 100 nm or less. When the film thickness is 1 nm or less, the improvement effect of the carbon coating is small, and when the film thickness exceeds 100 nm, the resistance increases. The film thickness of the coating layer can be measured by observation with a transmission electron microscope (TEM).

The coating layer containing DLC can be produced by physical vapor deposition (PVD) such as, for example, a sputtering method or an arc ion plating method. The physical properties of DLC can be controlled. For example, when the DLC is formed by the sputtering method, the G/D ratio and the film thickness can be set in any manner by controlling the power supply output, processing time, sample temperature, gas pressure, and the like.

(Cathode Active Material)

The cathode active material is an electrode active material capable of reversibly carrying out the absorption and desorption of lithium ions, the elimination and insertion (intercalation) of lithium ions, or the doping and dedoping of lithium ions and counter anions.

The cathode active material is, for example, a composite metal oxide. Examples of the composite metal oxide include the compounds of lithium cobalt oxide ($LiCoO_2$), lithium nickel oxide ($LiNiO_2$), lithium manganese oxide ($LiMnO_2$), and lithium manganese spinel ($LiMn_2O_4$), a compound expressed by the general formula: $LiNi_xCo_yMn_zM_aO_2$ (in the general formula, $x+y+z+a=1$, $0 \le x<1$, $0 \le y<1$, $0 \le z<1$, $0 \le a<1$, where M is one or more kinds of elements selected from Al, Mg, Nb, Ti, Cu, Zn, and Cr), lithium vanadium compound ($LiV_2O_5$), olivine-type LiMPO4 (where M is one or more kinds of elements selected from Co, Ni, Mn, Fe, Mg, Nb, Ti, Al, and Zr, or VO), lithium titanate ($Li_4Ti_5O_{12}$), and $LiNi_xCo_yAl_zO_2$ ($0.9<x+y+z<1.1$). The cathode active material may be an organic substance. For example, the cathode active material may be polyacetylene, polyaniline, polypyrrole, polythiophene, or polyacene.

The cathode active material may contain, for example, any one selected from the group consisting of nickel, cobalt, manganese, and aluminum. The cathode active material is, for example, a ternary compound containing any one selected from the group consisting of nickel, cobalt, manganese, and aluminum. Nickel-cobalt-lithium manganese oxide (NCM) and nickel-cobalt-lithium aluminate (NCA) are examples of ternary compounds. The ternary compound can be used even at a high potential.

The cathode active material may be a lithium-free material. The lithium-free material is, for example, $FeF_3$, a conjugated polymer containing an organic conductive substance, a Chevrel phase compound, a transition metal chalcogenide, a vanadium oxide, a niobium oxide, or the like. As the lithium-free material, only one of the materials may be used, or a plurality of materials may be used in combination. When the cathode active material is a lithium-free material, for example, discharging is performed first. Lithium is inserted into the cathode active material by discharging. In addition, lithium may be chemically or electrochemically pre-doped into a lithium-free material as the cathode active material.

(Conductive Auxiliary Agent)

Conductive auxiliary agents enhance electron conductivity between cathode active materials. The conductive auxiliary agent is, for example, a carbon powder, a carbon nanotube, a carbon material, a metal fine powder, a mixture of a carbon material and a metal fine powder, or a conductive oxide. The carbon powder is, for example, carbon black, acetylene black, Ketjen black and the like. The metal fine powder is, for example, powder such as copper, nickel, stainless steel, and iron.

The content of the conductive auxiliary agent in the cathode active material layer 14 is not particularly limited. For example, the content of the conductive auxiliary agent with respect to the total mass of the cathode active material, the conductive auxiliary agent, and the binder is 0.5% by mass or more and 20% by mass or less, and preferably 1% by mass or more and 5% by mass or less.

(Cathode Binder)

The binder in the cathode active material layer 14 binds the cathode active materials to each other. As the binder, a known binder can be used. Examples of the binder include fluororesins such as polyvinylidene fluoride (PVDF) and polytetrafluoroethylene (PTFE), cellulose, styrene/butadiene rubber, ethylene/propylene rubber, polyimide resin, polyamide-imide resin and the like. Further, the binder may be an electron-conducting conductive polymer or an ion-conducting conductive polymer. The electron-conducting conductive polymer is, for example, polyacetylene, polythiophene, polyaniline, or the like. The ion-conducting conductive polymer is, for example, a composite of a polyether polymer compound such as polyethylene oxide or polypropylene oxide and a lithium salt such as $LiClO_4$, $LiBF_4$, or $LiPF_6$.

The content of the binder in the cathode active material layer 14 is not particularly limited. For example, the content of the binder is 0.5% by mass or more and 5% by mass or less with respect to the total mass of the cathode active material, the conductive auxiliary agent, and the binder.

<Anode>

The anode 20 has, for example, an anode current collector 22 and an anode active material layer 24. The anode active material layer 24 is formed on at least one surface of the anode current collector 22.

[Anode Current Collector]

The anode current collector 22 is, for example, a conductive plate material. As the anode current collector 22, the same one as the cathode current collector 12 can be used. The anode current collector 22 is, for example, a copper foil.

[Anode Active Material Layer]

The anode active material layer 24 contains, for example, an anode active material. The cathode active material layer 24 may contain a conductive auxiliary agent and a binder, if necessary.

(Anode Active Material)

The anode active material may be any compound that can store and release lithium ions, and a known anode active material used in a lithium-ion secondary battery can be used. The anode active material, for example, reversibly proceeds with the desorption and insertion of lithium ions.

The anode active material is, for example, metallic lithium, a lithium alloy, a carbon material, or a substance that can be alloyed with lithium. The carbon material is, for example, graphite (natural graphite, artificial graphite) capable of storing and releasing ions, carbon nanotubes, non-graphitizable carbon, easily graphitized carbon, low-temperature calcined carbon and the like. Substances that can be alloyed with lithium include, for example, silicon, tin, zinc, lead, and antimony. The substance that can be alloyed with lithium may be, for example, these metal simple substances, alloys or oxides containing these elements. Further, the substance that can be alloyed with lithium may be a complex in which at least a part of the surface thereof is coated with a conductive material (for example, a carbon material) or the like.

(Conductive Auxiliary Agent and Anode Binder)

As the conductive auxiliary agent and the binder, the same ones as those of the cathode 10 can be used. In addition to those of the cathode 10, the binders in the anode 20 may be cellulose, styrene/butadiene rubber, ethylene/propylene rubber, polyimide resin, polyamide-imide resin, and acrylic resin. Cellulose may be, for example, carboxymethyl cellulose (CMC) or the like.

<Separator>

The separator 18 is sandwiched between the cathode 10 and the anode 20. The separator 18 isolates the cathode 10 and the anode 20, and prevents a short circuit between the cathode 10 and the anode 20. The separator 18 extends in-plane along the cathode 10 and the anode 20. Lithium ions can pass through the separator 18.

The separator 18 has, for example, an electrically insulating porous structure. The separator 18 is, for example, a monolayer or a laminated body of a polyolefin film. The separator 18 may be a stretched film of a mixture such as polyethylene or polypropylene. The separator 18 may be a fibrous nonwoven fabric made of at least one constituent material selected from the group consisting of cellulose, polyester, polyacrylonitrile, polyamide, polyethylene, and polypropylene. The separator 18 may be, for example, a solid electrolyte. The solid electrolyte is, for example, a polymer solid electrolyte, an oxide-based solid electrolyte, or a sulfide-based solid electrolyte. The separator 18 may be an inorganic coated separator. The inorganic coated separator is obtained by coating the surface of the above film with a mixture of a resin such as PVDF or CMC and an inorganic substance such as alumina or silica. The inorganic coated separator has excellent heat resistance and suppresses the precipitation of transition metals eluted from the cathode on the surface of the anode.

<Electrolytic Solution>

The electrolytic solution is sealed in the case 50 and impregnated in the laminated body 30. The electrolytic solution has, for example, a solvent and an electrolyte.

(Solvent)

The solvent can be used by mixing the solvent generally used for a lithium-ion secondary battery in any ratio. For example, cyclic carbonate compounds such as ethylene carbonate (EC), propylene carbonate (PC), and butylene carbonate; chain carbonate compounds such as diethyl carbonate (DEC), ethylmethyl carbonate (EMC), and dimethyl carbonate (DMC); cyclic ester compounds such as γ-butyrolactone (GBL); and chain ester compounds such as propyl propionate (PrP), ethyl propionate (PrE), and ethyl acetate, can be used as the solvent.

(Electrolyte)

The electrolyte is not particularly limited as long as the electrolyte is a lithium salt used as an electrolyte of a lithium-ion secondary battery. For example, an inorganic acid anion salt such as $LiPF_6$, $LiBF_4$, or lithium bisoxalate borate, an organic acid anion salt such as $LiCF_3SO_3$, $(CF_3SO_2)_2NLi$, or $(FSO_2)_2NLi$, or the like can be used as the electrolyte.

<Case>

The case 50 seals the laminated body 30 and the electrolytic solution inside the case 50. The case 50 suppresses leakage of the electrolytic solution to the outside and invasion of water and the like into the lithium-ion secondary battery 100 from the outside.

The case 50 has, for example, as illustrated in FIG. 1, a metal foil 52 and resin layers 54 laminated on each surface of the metal foil 52. The case 50 is a metal laminate film in which the metal foil 52 is coated from both sides with a polymer film (resin layer 54).

As the metal foil 52, for example, an aluminum foil can be used. A polymer film such as polypropylene can be used for the resin layer 54. The materials that form the resin layer 54 may be different between the inside and the outside. For example, a polymer having a high melting point, for example, polyethylene terephthalate (PET) or polyamide (PA), is used as the outer material, and polyethylene (PE), polypropylene (PP), or the like can be used as the material of the inner polymer film.

<Lead>

The leads 60 and 62 are connected to the cathode 10 and the anode 20, respectively. The lead 60 connected to the cathode 10 is a cathode terminal, and the lead 62 connected to the anode 20 is an anode terminal. The leads 60 and 62 are responsible for electrical connection with the outside. The leads 60 and 62 are formed of a conductive material such as aluminum, nickel, and copper. The connection method may be welding or screwing. It is preferable to protect the leads 60 and 62 with an insulating tape in order to prevent a short circuit.

The lithium-ion secondary battery 100 can be produced by a known method. When the cathode active material layer 14 is produced, the additive containing the above-described lithium iron complex oxide is added.

The lithium-ion secondary battery 100 according to the present embodiment contains a microcrystalline lithium iron complex oxide of which the results analyzed by using $^{57}Fe$ Mössbauer spectroscopy satisfy predetermined conditions. The microcrystalline lithium iron complex oxide has a large reaction surface area and a sufficiently large irreversible capacity. Therefore, the lithium iron complex oxide functions as a pre-doped material in the lithium-ion secondary battery 100, and the reversible capacity of the lithium-ion secondary battery 100 can be increased.

Further, by coating the lithium iron complex oxide with a predetermined coating layer, it is possible to suppress the reduction of the lithium iron complex oxide. As a result, the irreversible capacity of the pre-doped material can be increased, and the reversible capacity of the lithium-ion secondary battery 100 can be increased.

Above, although the embodiments of the present invention have been described in detail with reference to the drawings, the respective configurations and combinations thereof in the respective embodiments are merely examples, and additions, omissions, substitutions, and other changes of configurations are possible within the scope not departing from the gist of the present invention.

EXAMPLE

Example 1

(Synthesis of $Li_5FeO_4$)

LiOH 0.805 mmol (9.63 g) as a Li source and $Fe_2O_3$ 0.0805 mmol (12.80 g) as a transition metal oxide were put into a stainless steel pot together with 100 g of 2 mmϕ$ZrO_2$ beads, and treated at 100 rpm for 12 hours using a pot mill rotary table manufactured by Makino Inc. to produce a precursor. The precursor was heated at 600° C. for 24 hours in an Ar atmosphere to obtain $Li_5FeO_4$.

(Microcrystallization)

5.0 g of $Li_5FeO_4$ obtained above was put into a stainless steel pot together with 100 g of 2 mmϕ$ZrO_2$ beads and treated at 300 rpm for 3 minutes using a planetary ball mill device manufactured by Fritsch Japan Co., Ltd to microcrystallize $Li_5FeO_4$.

(Mössbauer Spectroscopic Analysis)

Mössbauer spectroscopic analysis was performed on $Li_5FeO_4$ which was microcrystallized as described above. When the obtained spectrum was fitted by the Lorentzian function, the separation between the peak A and the peak B was confirmed. The spectroscopic results are shown in Table 1.

(Production of Cathode)

$LiCoO_2$ was used as the cathode active material, lithium iron complex oxide after microcrystallization was used as the additive, carbon black was used as the conductive auxiliary agent, and PVDF was used as the binder. $LiCoO_2$: Lithium iron complex oxide:Carbon black:PVDF=80:10:5:5 (parts by mass) was mixed. This was dispersed in N-methyl-2-pyrrolidone (NMP) using a hybrid mixer to adjust a slurry for forming a cathode active material layer. An aluminum foil having a thickness of 20 μm was coated with this slurry such that the coating amount is 13.0 mg/cm$^2$, and dried at 100° C. to form a cathode active material layer. Then, this was pressure-molded by a roller press machine to produce a cathode.

(Production of Anode)

A 500 μm Li foil was used as the anode active material. The Li foil was attached to a copper foil having a thickness of 20 μm and pressure-molded by a roller press to produce an anode.

(Production of Electrolytic Solution)

Ethylene carbonate (EC) and diethyl carbonate (DEC) were used as the solvent, and lithium hexafluorophosphate ($LiPF_6$) was used as the supporting salt. Mixing was performed such that EC:DEC=50:50 (parts by volume), and $LiPF_6$ was dissolved into the mixture such that the concentration is 1.0 mol/L to produce an electrolytic solution.

(Production of Lithium-Ion Secondary Battery for Evaluation)

The cathode and the anode produced above were sequentially laminated via a polyethylene separator. The tab leads were ultrasonically welded to this laminated body and then packaged in an aluminum laminate pack. Then, the electrolytic solution produced above was injected and vacuum-sealed to produce a lithium-ion secondary battery for evaluation.

(Measurement of Irreversible Capacity of $Li_5FeO_4$)

The lithium-ion secondary battery for evaluation produced above was put into a thermostatic chamber set at 25° C. and evaluated by a charging/discharging test device manufactured by HOKUTO DENKO CORPORATION. First, charging was performed by constant current charging with a current value of 0.1 C until the battery voltage reaches 4.4 V, and then discharging was performed by constant current discharge with a current value of 0.1 C until the battery voltage reaches 3.0 V. The charging of the current value (X)C means a current value that can charge this battery in (1/X) time. The charging capacity—discharging capacity obtained above was defined as the irreversible capacity, and the obtained values are shown in Table 1. Since the reaction potentials of $Li_5FeO_4$ and $LiCoO_2$ are different, only the irreversible capacity of $Li_5FeO_4$ can be extracted. The larger this value is, the more effectively the additive works as a lithium pre-doped material.

Example 2

Example 2 differs from Example 1 in that the treatment conditions for microcrystallization of $Li_5FeO_4$ are changed. In Example 2, the treatment at 500 rpm for 3 minutes was performed a total of 3 times. Other conditions were the same as in Example 1, and an evaluation was performed.

Example 3

Example 3 differs from Example 1 in that the treatment conditions for microcrystallization of $Li_5FeO_4$ are changed. In Example 3, the treatment at 550 rpm for 3 minutes was performed a total of 3 times. Other conditions were the same as in Example 1, and an evaluation was performed.

Example 4

Example 4 differs from Example 1 in that the treatment conditions for microcrystallization of $Li_5FeO_4$ are changed. In Example 4, the treatment at 600 rpm for 3 minutes was performed a total of 3 times. Other conditions were the same as in Example 1, and an evaluation was performed.

Example 5

Example 5 differs from Example 1 in that the treatment conditions for microcrystallization of $Li_5FeO_4$ are changed. In Example 5, the treatment at 500 rpm for 1 minute was performed a total of 9 times. Other conditions were the same as in Example 1, and an evaluation was performed.

Example 6

Example 6 differs from Example 1 in that the treatment conditions for microcrystallization of $Li_5FeO_4$ are changed. In Example 5, the treatment at 500 rpm for 9 minutes was performed a total of 1 time. Other conditions were the same as in Example 1, and an evaluation was performed.

Comparative Example 1

Comparative Example 1 differs from Example 1 in that the treatment for microcrystallization of $Li_5FeO_4$ was not performed. Other conditions were the same as in Example 1, and an evaluation was performed.

Measurement of irreversible capacity of $Li_5FeO_4$ was performed with respect to the lithium-ion secondary batteries for evaluation produced in Examples 2 to 6 and Comparative Example 1, similarly to Example 1. The results are shown in Table 1.

In each of Examples 1 to 6, the irreversible capacity was increased as compared with Comparative Example 1. It is considered that the reaction efficiency of $Li_5FeO_4$ was improved by microcrystallization.

Further, from the results of Examples 5 to 6, it was clarified that the IS value was preferably 0.05 or more and 0.25 or less.

TABLE 1

| | Peak A | | | Peak B | | | $S_B/(S_A + S_B)$ | Irreversible capacity (mAh/g) |
|---|---|---|---|---|---|---|---|---|
| | QS | IS | $S_A$ | QS | IS | $S_B$ | | |
| Example 1 | 0.94 | 0.12 | 98 | 0 | 0.22 | 2 | 0.22 | 681 |
| Example 2 | 0.94 | 0.11 | 57 | 0 | 0.22 | 43 | 0.43 | 695 |
| Example 3 | 0.94 | 0.11 | 51 | 0 | 0.21 | 49 | 0.49 | 690 |
| Example 4 | 0.94 | 0.10 | 47 | 0 | 0.22 | 53 | 0.53 | 673 |
| Example 5 | 0.94 | 0.04 | 57 | 0 | 0.16 | 43 | 0.43 | 659 |
| Example 6 | 0.94 | 0.16 | 55 | 0 | 0.28 | 44 | 0.44 | 655 |
| Comparative Example 1 | 0.94 | 0.16 | 100 | — | — | — | — | 614 |

Example 7

Example 7 is different from Example 1 in that a coating layer of lithium silicate is formed on the surface of $Li_5FeO_4$. Other conditions were the same as in Example 1, and an evaluation was performed. The amount of the slurry applied to the aluminum foil when the cathode active material layer was produced was 13.0 mg/cm$^2$.

(Formation of Coating Layer)

10.0 g of $Li_5FeO_4$ and 12.0 mg of $Li_4SiO_4$ as a lithium silicate material was put into a polypropylene pot together with 100 g of 2 mmφ$ZrO_2$ beads, and rotated at 100 rpm for 2 hours using a pot mill rotary table manufactured by Makino Inc. to form the coating layer. Further, when the quantification of the coating layer was performed by optical emission spectroscopic analysis (ICP), the coating layer in the amount shown in the coating amount in Table 2 was formed.

Example 8

Example 8 differs from Example 7 in that $Li_4SiO_4$ was set to 54.0 mg as the lithium silicate material at the time of forming the coating layer. Other conditions were the same as in Example 7, and an evaluation was performed.

Example 9

Example 9 differs from Example 7 in that $Li_4SiO_4$ was set to 304 mg as the lithium silicate material at the time of forming the coating layer. Other conditions were the same as in Example 7, and an evaluation was performed.

Example 10

Example 10 differs from Example 7 in that $Li_4SiO_4$ was set to 404 mg as the lithium silicate material at the time of forming the coating layer. Other conditions were the same as in Example 7, and an evaluation was performed.

Example 11

Example 11 differs from Example 7 in that $Li_2SiO_3$ was set to 54.0 mg as the lithium silicate material at the time of forming the coating layer. Other conditions were the same as in Example 7, and an evaluation was performed.

Example 12

Example 12 differs from Example 7 in that $Li_8SiO_6$ was set to 54.0 mg as the lithium silicate material at the time of forming the coating layer. Other conditions were the same as in Example 7, and an evaluation was performed.

Example 13

Example 13 differs from Example 7 in that $Li_2Si_2O_6$ was set to 54.0 mg as the lithium silicate material at the time of forming the coating layer. Other conditions were the same as in Example 7, and an evaluation was performed.

Example 14

Example 14 differs from Example 7 in that 54.0 mg of carbon black was used instead of the lithium silicate material at the time of forming the coating layer. Other conditions were the same as in Example 7, and an evaluation was performed.

Example 15

Example 15 is different from Example 7 in that the coating layer is diamond-like carbon (DLC). Other conditions were the same as in Example 7, and an evaluation was performed.

The DLC was formed using a barrel sputtering device under the conditions of output voltage: 4.0 kV, gas pressure: 1 Pa, processing time: 3 minutes, and barrel rotation speed: 10 rpm.

The results of Examples 7 to 15 are summarized in Table 2.

TABLE 2

| | Core | Coating layer | Coating amount (parts by mass) | Irreversible capacity (mAh/g) |
|---|---|---|---|---|
| Example 7 | $Li_5FeO_4$ | $Li_4SiO_4$ | 0.1 | 688 |
| Example 8 | $Li_5FeO_4$ | $Li_4SiO_4$ | 0.5 | 695 |
| Example 9 | $Li_5FeO_4$ | $Li_4SiO_4$ | 3.0 | 690 |
| Example 10 | $Li_5FeO_4$ | $Li_4SiO_4$ | 4.0 | 656 |
| Example 11 | $Li_5FeO_4$ | $Li_2SiO_3$ | 0.5 | 690 |
| Example 12 | $Li_5FeO_4$ | $Li_8SiO_6$ | 0.5 | 677 |
| Example 13 | $Li_5FeO_4$ | $Li_2Si_2O_5$ | 0.5 | 674 |
| Example 14 | $Li_5FeO_4$ | CB | 0.5 | 653 |
| Example 15 | $Li_5FeO_4$ | DLC | 0.5 | 663 |

In Examples 7 to 13 and Example 15, the irreversible capacity of $Li_5FeO_4$ was larger than that in Example 14. In other words, when a predetermined coating layer containing lithium silicate or diamond-like carbon is formed on the surface of $Li_5FeO_4$, the reaction efficiency as a pre-doped material is enhanced.

Further, in Examples 7 to 9, the irreversible capacity of $Li_5FeO_4$ was larger than that in Example 10. In other words, an appropriate coating amount of the coating layer was confirmed.

Example 16

Using the cathode prepared under the same conditions as in Example 1, a full cell of a lithium-ion secondary battery was produced with the anode having the following configuration, and the cycle characteristics of the lithium-ion secondary battery were measured.

(Production of Anode)

Graphite was used as the anode active material, carbon black was used as the conductive auxiliary agent, and styrene-butadiene rubber (SBR) and carboxymethyl cellulose (CMC) were used as the binder. Mixing was performed at a ratio of graphite:carbon black:SBR:CMC=90:4:3:3 (parts by mass) and the mixture was dispersed in N-methyl-2-pyrrolidone (NMP) using a hybrid mixer to adjust the slurry for forming the anode active material layer. A copper foil having a thickness of 20 μm was coated with this slurry such that the coating amount is 9.0 mg/cm$^2$, and dried at 100° C. to form an anode active material layer. Then, this was pressure-molded by a roller press machine to produce an anode.

(Measurement of Cycle Characteristics)

The lithium-ion secondary battery for evaluation of full cell produced above was put into a thermostatic chamber set at 25° C. and evaluated by a charging/discharging test device manufactured by HOKUTO DENKO CORPORATION. First, charging was performed by constant current charging with a current value of 0.1 C until the battery voltage reaches 4.4 V, and then discharging was performed by constant current discharge with a current value of 0.1 C until the battery voltage reaches 3.0 V.

Subsequently, charging was performed by constant current charging with a current value of 0.5 C until the battery voltage reaches 4.4 V, and discharging was performed by constant current discharge with a current value of 0.5 C until the battery voltage reaches 3.0 V. This charging/discharging was defined as one cycle, and 300 cycles of charging/discharging were repeated. It is defined that the maintenance rate after 300 cycles (cycle characteristics)=300th cycle discharging capacity/1st cycle discharging capacity×100 [%].

Example 17

Example 17 differs from Example 16 in that a coating layer of diamond-like carbon (DLC) is formed on the surface of $Li_5FeO_4$. Other conditions were the same as in Example 16, and an evaluation was performed.

Diamond-like carbon (DLC) was produced in the same manner as in Example 15. The lithium iron complex oxide coated with DLC was analyzed using a microlaser Raman spectrophotometer manufactured by aiser and a laser beam having a wavelength of 532 nm. Then, the G/D ratio and the presence or absence of peak overlap were determined from the obtained spectrum. Further, the film thickness of the coating layer was measured at an acceleration voltage of 200 kV using a transmission electron microscope manufactured by Hitachi High-Tech Corporation.

Example 18

Example 18 is the same as Example 17 except that the treatment time for forming the DLC is 15 minutes. Other conditions were the same as in Example 16, and an evaluation was performed.

Example 19

Example 19 is the same as Example 17 except that the treatment time for forming the DLC is 5 hours. Other conditions were the same as in Example 16, and an evaluation was performed.

Example 20

Example 20 is the same as Example 18 except that the treatment time for forming the DLC is 5.5 hours. Other conditions were the same as in Example 16, and an evaluation was performed.

Example 21

Example 21 is the same as Example 18 except that the output voltage for forming the DLC is 3.0 kV. Other conditions were the same as in Example 16, and an evaluation was performed.

Example 22

Example 22 is the same as Example 18 except that the output voltage for forming the DLC is 5.0 kV. Other conditions were the same as in Example 16, and an evaluation was performed.

Example 23

Example 23 is different from Example 16 in that a coating layer of carbon is formed on the surface of $Li_5FeO_4$ by using a thermal CVD. Other conditions were the same as in Example 17, and an evaluation was performed.

The results of Examples 16 to 23 are summarized in Table 3.

TABLE 3

| | Core | Coating layer | G/D ratio | Peak overlap | Film thickness (nm) | Cycle characteristics (%) |
|---|---|---|---|---|---|---|
| Example 16 | $Li_5FeO_4$ | — | — | — | — | 58 |
| Example 17 | $Li_5FeO_4$ | DLC | 1.5 | Yes | 1.0 | 80 |
| Example 18 | $Li_5FeO_4$ | DLC | 1.5 | Yes | 5.0 | 82 |
| Example 19 | $Li_5FeO_4$ | DLC | 1.5 | Yes | 100 | 80 |
| Example 20 | $Li_5FeO_4$ | DLC | 1.5 | Yes | 110 | 77 |
| Example 21 | $Li_5FeO_4$ | DLC | 1.1 | Yes | 5.0 | 82 |
| Example 22 | $Li_5FeO_4$ | DLC | 1.7 | Yes | 5.0 | 76 |
| Example 23 | $Li_5FeO_4$ | Thermal CVD carbon | 2.0 | No | 5.0 | 64 |

Examples 17 to 22 on which the DLC coating layer was formed were superior in cycle characteristics performance to Examples 16 and 23.

REFERENCE SIGNS LIST

10 Cathode
12 Cathode current collector
14 Cathode active material layer
18 Separator
20 Anode
22 Anode current collector
24 Anode active material layer
30 Laminated body
50 Case
52 Metal foil
54 Resin layer
60, 62 Lead
100 Lithium-ion secondary battery

What is claimed is:

1. A lithium iron complex oxide, wherein
the lithium iron complex oxide is represented by $Li_5FeO_4$,
two peaks with different quadrupole splitting values (QS) analyzed using $^{57}Fe$ Mössbauer spectroscopy are shown,
one of the two peaks, a peak A, satisfies QS>0, and
the other one of the two peaks, a peak B, satisfies QS=0.

2. The lithium iron complex oxide according to claim 1, wherein
the peak A and the peak B have an isomer shift value (IS) of 0.05 or more and 0.25 or less, respectively.

3. The lithium iron complex oxide according to claim 1, wherein
when an area value of the peak A is $S_A$ and an area value of the peak B is $S_B$, $0.01 \leq S_B/(S_A+S_B) \leq 0.50$ is satisfied.

4. A cathode material containing
the lithium iron complex oxide according to claim 1.

5. A cathode material containing
the lithium iron complex oxide according to claim 1, and
a coating layer which coats a surface of the lithium iron complex oxide, wherein
the coating layer contains lithium silicate.

6. The cathode material according to claim 5, wherein
a mass ratio of the coating layer is 0.1% by mass or more and 3.0% by mass or less with respect to the entire cathode material.

7. A cathode material containing
the lithium iron complex oxide according to claim 1, and
a coating layer which coats a surface of the lithium iron complex oxide, wherein
the coating layer contains diamond-like carbon.

8. The cathode material according to claim 7, wherein
in Raman spectrum analysis of the coating layer, a spectrum of a G band of 1580 cm$^{-1}$ and a spectrum of a D band of 1350 cm$^{-1}$ partially overlap each other, and
a G/D ratio, which is a ratio of peak intensities of the G band to the D band, is 1.5 or less.

9. A cathode containing the cathode material according to claim 4.

10. A lithium-ion secondary battery comprising:
the cathode according to claim 9.

* * * * *